3,112,612
ROCKET MOTOR
Arthur P. Adamson, Cincinnati, Ohio, and Kurt Berman, Schenectady, N.Y., assignors to General Electric Company, a corporation of New York
Filed July 21, 1958, Ser. No. 749,744
7 Claims. (Cl. 60—35.6)

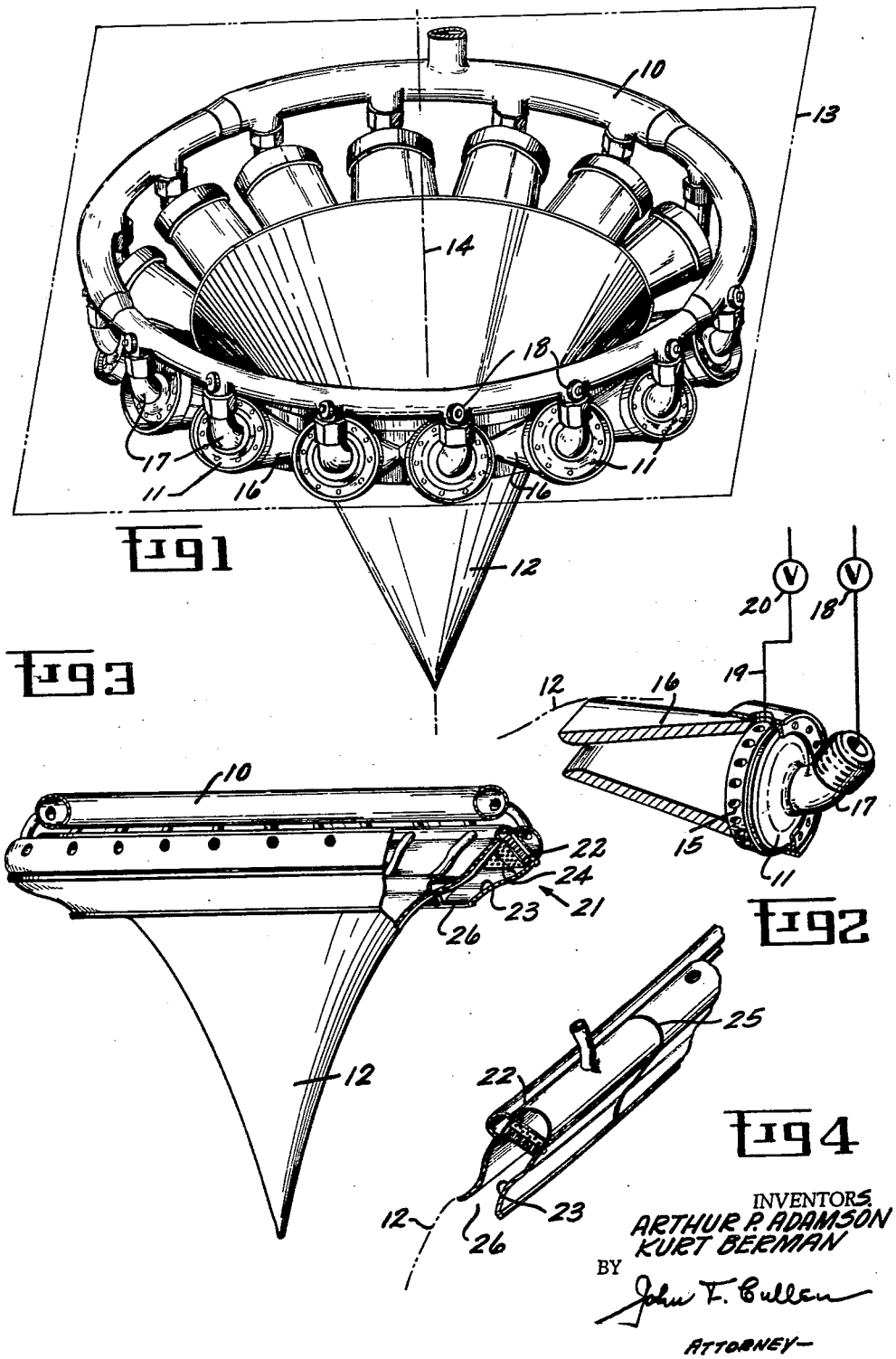

The instant invention relates to a rocket motor and, more particularly, to a cellular rocket motor of the order of one million pounds of thrust and upwards.

In present-day rockets, there is a need for vehicles that develop a million pound thrust or larger. The main problem is that of arriving at a rational design consistent with the present technological state of the art. The conventional rocket normally employs a De Laval nozzle combined with a round injector and a combustion chamber to form the rocket motor. In such an arrangement, the thrust is proportional to the area of the nozzle throat. Since the chamber cross-sectional area and injector diameter have a direct relationship to the throat area, they, too, increase directly with thrust. The difficulty in developing the large thrust vehicles or motors, lies in trying to scale up the conventional arrangement.

For example, a million pound thrust engine in one approach, using conventional techniques, would require an injector having a diameter of four or five feet. There is, however, a phenomenon in rocketry called combustion instability. This consists of violent pressure oscillations in the chamber which either burn out the chamber or tear it apart in short order since the oscillations can be of the order of several hundred pounds per square inch. The control of combustion stability gets more severe the larger the diameter of the injector. Qualitatively, it appears necessary to have practically uniform pressure distribution and uniform combustion across the injector to produce stable operation. With large injector diameters, the probability of obtaining this uniformity decreases and combustion instability is very likely to occur.

The present state of the art is such that no predictable, quantitative scaling law exists to predict a satisfactory new and larger rocket engine design based on an existing engine. This is basically due to the combustion instability phenomenon. In nearly every instance in which a new thrust chamber assembly has been developed, combustion instability difficulties have been experienced which have required a tedious, lengthy, and costly trial and error development program, and there is reason to believe the solution will become increasingly difficult and costly as the size increases. Thus, it is impossible to scale up a conventional design to higher thrust levels with any assurance of normal operation or reliability.

A second approach towards obtaining extremely high thrust rocket engines has been to cluster together existing developed motors or engines to provide the required thrust. This approach suffers from complexity in the control system to maintain uniform performance as well as severely limiting the growth potential of the propulsion system since there is a practical limit as to how many engines can be bundled together. In addition, the thrust transmission from the individual engine units to the vehicle becomes difficult and may be subject to interaction phenomenon among these units.

In the development of rockets, the testing program is an extremely important phase. Since there is no existing engine scaling criterion, all testing must be done on full scale units because sub-scale testing has limited meaning primarily because of the combustion instability problem. Full scale testing is not desired because a fifty million pound thrust unit, for example, uses around two hundred thousand pounds of propellant per second. Even at ten cents a pound, this means the propellant cost will be twenty thousand dollars per second; so if all testing must be done on full scale units, the expenses become prohibitive for even standard, low cost propellants.

In conventional rockets, directional control is normally obtained by gimbaling the motor. As the thrust level increases, the gimbaling loads and thrust structure weight get very large. The weight of the thrust transmission mechanism goes up non-linearly as the thrust increases resulting in the transmission mechanism becoming an appreciable portion of the propulsion system in large thrust systems.

Inasmuch as present technology does not provide a valid scaling-up concept, a new concept is required that permits the use of existent technology and in which combustion stability is a scalable phenomenon.

Our novel concept to solve the above problems in large thrust rocket engines consists of using a cellular arrangement of injectors and combustion chambers in combination with a common plug nozzle. Since instability can be suppressed by keeping critical combustion dimensions below certain limits, this concept permits high thrust engines with known technology.

The main object of the present invention is to provide a rocket motor, which is practical for thrusts of one million pounds and above.

Another object is to provide such a motor which uses existent technology in order to obtain extremely large thrusts without encountering combustion instability.

A further object is to provide such a motor which is practical for thrusts of a million pounds and above and requires only the testing of known units which are completely reliable and thus avoids the prohibitive expense involved in full-scale testing.

Briefly stated, our invention discloses a rocket motor which utilizes a propellant carrying member or members directing propellant to a plurality of combustion chamber assemblies peripherally arranged in cellular fashion around a common plug nozzle. The combustion chamber assemblies may consist of individual combustion chambers connected below individual injectors of small size or may consist of substantially continuous combustion chambers connected to strip injectors of fixed dimensions that are below the critical dimensions. In the former, the individual injectors are of known small diameter to avoid instability problems. In the latter, the length and width of the strip injector are kept below critical limits. Both arrangements thus use a cellular concept of combustion chamber assemblies to discharge sheet-like into a common plug nozzle. Aerodynamic steering or thrust vector control of the motor is obtained, in this cellular concept of combustion chamber assemblies with a plug nozzle, by selectively directing propellant to the individual assemblies or cells to vary the chamber pressure therein and vary the thrust around the plug nozzle. Any suitable combustion chamber assemblies may be employed in the invention. The invention is applicable to mono-propellants or to the conventional fuel and oxidizer propellants including liquid or solid bi-propellants, all of which may use any suitable propellant storage means.

While the specification concludes with claims particularly pointing out and distinctly claiming the subject matter which we regard as our invention, it is believed the invention will be better understood from the following description taken in connection with the accompanying drawing in which:

FIGURE 1 is a perspective view of one form of the rocket motor of the instant invention;

FIGURE 2 is a perspective view, partially broken away, of a typical combustion chamber assembly used with FIGURE 1;

FIGURE 3 is an elevation view, partially in cross-section, showing a different modification of rocket motor;

FIGURE 4 is a perspective view, partially broken away, of a typical combustion chamber assembly as used with FIGURE 3.

Referring first to FIGURE 1, there is shown a rocket motor in accordance with the instant invention, which motor may act as the complete vehicle or may have a pay load mounted on top of it in the conventional manner. The motor consists of an annular chamber 10 which is a propellant carrying member, a plurality of peripherally spaced combustion chamber assemblies 11 which can be supported directly on member 10 or, if other parts are used in the vehicle, can be supported from any suitable part. It is to be noted that annular member 10 is a convenient execution and any shape propellant storage means may be used. Disposed centrally of the annular chamber 10 and depending therefrom, is a single plug nozzle 12 closed at its downstream end and called a closed plug nozzle for convenience which, with the combustion chamber assemblies 11 around its base, develops the thrust. Any suitable shaped plug may be used, such as a cone, whether round or elliptical, as shown in FIGURE 1, or some exponential shaped curve as shown in FIGURE 3. As will be apparent from the description following, the "plug nozzle" herein employed is of the type which is used in conjunction with annular combustors or combustion systems terminating in an annular throat.

It will be noted that the reference plane shown as 13 in phantom passes through the plug base and this plane is substantially at right angles to the axis 14 of the plug nozzle so that the thrust is directed substantially perpendicularly to the plane through the base of the plug.

Referring to FIGURE 2 next, there is shown a typical combustion chamber assembly as used in the FIGURE 1 motor, which assembly comprises an injector 15 and a combustion chamber 16 to direct its exhaust from an annular throat into the nozzle 12 as shown in FIGURE 1. Obviously, the combustion chamber assembly shown in FIGURE 2 may take many suitable forms. It is to be noted that the injector 15 is kept within the present bounds of known technology to avoid combustion instability. In other words, injector 15 is small enough that no critical dimensions are exceeded and it can be easily tested and its characteristics can be determined so that the problem of combustion instability is obviated. Thus, a series of abutting combustion chamber assemblies are arranged in a cellular concept around the periphery of the plug nozzle to discharge from an annulus sheet-like into the nozzle.

In order to direct propellant to any combustion chamber assembly, suitable piping 17 having a valve 18 therein may be connected to the propellant carrying member 10. In the case of a mono-propellant, a single pipe 17 is required. In the case of the conventional fuel and oxidizer propellants, an additional pipe 19 with a valve 20 will be employed. The normal pumps and any accessory equipment required, not shown, will of course, be used. In this respect, it is to be noted that much of this equipment can be carried within nozzle 12, FIGURE 1. In addition, the nozzle may serve as a propellant storage area if desired.

In operation, propellant is directed from annular storage member 10 through the pipe or pipes 17, 19 into injector 15 and injected into combustion chamber 16 where it is burned and exhausted from an annular throat into the nozzle 12 to produce thrust. Valves 18, 20 permit selective directing of the propellant to the various combustion chamber assemblies so that directional control may be obtained. For example, any of the combustor assemblies may be turned off to increase thrust on the opposite side of the nozzle and change direction of the rocket motor. Also, the thrust, by the selective valve mechanism, may be reduced by cutting down on any one or more of the individual combustor chamber assemblies. Thus, complete flexibility as to quantity and direction of thrust is obtainable.

Referring next to FIGURE 3, a different modification of the motor using a cellular concept is shown. In place of the individual round injectors with their corresponding annular combustion chambers as shown in FIGURE 2 and used as shown in FIGURE 1, we employ what we term a strip injector in a cellular concept around the plug nozzle.

The motor consists of a propellant carrying member 10 which may be annular as shown or may be any suitable shape. A plug nozzle 12 is provided and, to provide thrust therewith, a plurality of combustion chamber assemblies 21 are peripherally spaced in abutting relation around the plug nozzle at its base in a cellular concept to form a sheet exhaust from an annular throat into the nozzle.

Referring now to FIGURE 4, there is shown a typical combustion chamber assembly that forms one of the cells in this cellular concept. The assembly consists of a strip injector 22 with its combustion chamber 23. These linear strips 22 and their associated combustion chambers can be kept within critical limits to avoid combustion instability. Thus, by keeping distance 24 small, any instability in this direction can be suppressed. Similarly, any instability arising in the peripheral direction can be suppressed by the placing of suitable baffles 25 to divide the combustion system into cells. It can be seen that this is merely another arrangement of the individual combustion assemblies as shown in FIGURE 1 using elongated strip elements rather than the conventional round ones and the same connection means employing valves as shown in FIGURE 2 are used. The actual degree of sub-division into cells is a function of the propellant distribution system used and is one of the parameters to be considered in the design of the motor.

In operation, propellant is directed from the storage means or member 10 through suitable pipes and valves to each of the injectors 22 in either single or dual streams depending on the propellant system. Propellant injection is made into combustion chamber 23 where it is burned and exhausted in a sheet through annulus 26 into nozzle 12 to produce thrust.

The built up, or cellular structure, of the rocket motor permits the use of known technology and avoids the combustion instability problem by breaking down into multiple or cellular units, the combustion chamber assemblies all discharging in a sheet into a common nozzle. Any suitable number of combustion chamber assemblies may be disposed around the base of the plug nozzle depending on the thrust required. It can be seen that the testing may be made of known devices without exceeding any critical diameters or dimensions of injectors since the combustion chamber assemblies are individually known. Such a rocket motor assembly may be made for extreme thrusts up to many millions of pounds which, by the conventional concepts, are completely impractical under present technology.

While we have hereinbefore described preferred forms of our invention, obviously many modifications and variations of the present invention are possible in the light of the above teachings. It is therefore to be understood that within the scope of the appended claims, the invention may be practiced otherwise than as specifically described.

We claim:
1. A rocket motor comprising, propellant carrying means, a closed plug nozzle having a base, a plurality of combustion chamber assemblies peripherally spaced along the base of said plug nozzle and discharging from an annular throat sheetlike into said nozzle, and means connecting said propellant carrying means and assemblies for selectively directing propellant to each assembly.

2. A rocket motor comprising, propellant carrying means, a closed plug nozzle having a base, a plurality of combustion chamber assemblies peripherally spaced around the base of said plug nozzle and disposed to discharge from an annular throat sheetlike into said nozzle, and means connecting said propellant carrying means and each assembly for selectively directing propellant to each assembly.

3. A rocket motor comprising, propellant carrying means, a closed plug nozzle having a base, a plurality of injectors, a combustion chamber connected to each injector, said injectors and combustion chambers being disposed along the base of the nozzle and said chambers discharging annularly and sheetlike into said plug nozzle, and means connecting each injector and said propellant carrying means to selectively direct propellant to each combustion chamber.

4. A rocket motor comprising, propellant carrying means, a closed plug nozzle having a base, a plurality of combustion chamber assemblies peripherally spaced along the base to form a substantially continuous annular sheet exhaust into said nozzle, and means connecting said propellant carrying means and assemblies for selectively directing propellant to each assembly.

5. A rocket motor comprising, propellant carrying means, a closed plug nozzle having a base, a plurality of strip injectors peripherally spaced along the base of said nozzle, a combustion chamber for each injector disposed to discharge annularly into said nozzle to form a substantially continuous sheet exhaust into said nozzle, and means connecting said propellant carrying means and assemblies for selectively directing propellant to each combustion chamber.

6. A cellular rocket motor comprising, propellant carrying means, a closed plug nozzle having a base, a plurality of strip injectors peripherally spaced around the base of said nozzle, a combustion chamber for each injector, said combustion chambers disposed in a substantially continuous annulus around said nozzle and disposed to discharge into said nozzle to form a sheet exhaust into the nozzle, and means connecting said propellant carrying means and injectors for selectively directing propellant to each combustion chamber.

7. A cellular rocket motor comprising, liquid propellant carrying means, a single closed plug nozzle having a base, a plurality of strip injectors peripherally spaced in abutting relation around the base of said nozzle, a combustion chamber for each injector, said combustion chambers disposed in abutting relation in a substantially continuous annulus around said nozzle to form a sheet exhaust into the nozzle, and means connecting said propellant carrying means and injectors for selectively directing propellant to each combustion chamber.

References Cited in the file of this patent

UNITED STATES PATENTS

| | | |
|---|---|---|
| 2,396,567 | Goddard | Mar. 12, 1946 |
| 2,683,962 | Griffith | July 20, 1954 |
| 2,703,962 | Olson | Mar. 15, 1955 |
| 2,714,999 | Thieblot et al. | Aug. 9, 1955 |
| 2,753,687 | Wissley et al. | July 10, 1956 |
| 2,928,235 | Johnson | Mar. 15, 1960 |

FOREIGN PATENTS

| | | |
|---|---|---|
| 1,036,205 | France | Sept. 4, 1953 |
| 633,336 | Great Britain | Dec. 12, 1949 |
| 749,009 | Great Britain | May 16, 1956 |

OTHER REFERENCES

Popular Mechanics, March 1932, pages 458–463.

Jet Propulsion, September 1957, vol. 27, No. 9, pages 1002–1004.